United States Patent [19]

Murase et al.

[11] Patent Number: 4,599,193
[45] Date of Patent: Jul. 8, 1986

[54] HIGHLY ELECTROCONDUCTIVE PYROLYZED PRODUCT RETAINING ITS ORIGINAL SHAPE AND COMPOSITION FORMED THEREFROM

[75] Inventors: Ichiki Murase, Otsu; Toshihiro Ohnishi, Takatsuki; Takanobu Noguchi, Otsu, all of Japan

[73] Assignee: Director-General of the Agency of Industrial Science and Technology, an Organ of the Ministry of International Trade and Industry of Japan, Tokyo, Japan

[21] Appl. No.: 622,582

[22] Filed: Jun. 20, 1984

[30] Foreign Application Priority Data

Jun. 30, 1983 [JP]  Japan .................................. 58-117124
Feb. 28, 1984 [JP]  Japan .................................. 59-35319

[51] Int. Cl.$^4$ .............................................. H01B 1/06
[52] U.S. Cl. ..................................... 252/511; 252/500; 252/502; 252/503; 252/506; 252/512; 252/518
[58] Field of Search ............... 252/502, 503, 506, 512, 252/518, 500; 528/481

[56] References Cited

U.S. PATENT DOCUMENTS 4,204,216  5/1980  Heeger et al. ...................... 252/500
4,222,903  9/1980  Heeger et al. ...................... 252/518
4,401,590  8/1983  Yoshimura et al. ................ 252/502
4,440,669  3/1984  Ivory et al. ......................... 528/490

OTHER PUBLICATIONS

Solid State Communications, vol. 35, pp. 135–139, (1980), Brom et al.
Burger et al, "Polyimides as Precursors for Artificial Carbon", *Carbon*, 1975, vol. 13, pp. 149–157, Kapton H.

*Primary Examiner*—Paul Lieberman
*Assistant Examiner*—Hoa Van Le
*Attorney, Agent, or Firm*—Stevens, Davis, Miller & Mosher

[57] ABSTRACT

A highly electroconductive carbonaceous material is obtained by pyrolysis in an inert atmosphere
a conjugated polymer represented by the general formula

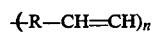

$$\{R-CH=CH\}_n$$

wherein R is an aromatic hydrocarbon group which forms a consecutive carbon to carbon conjugated system with the vinylene group, and n is an integer of at least 2, at a temperature above 400° C., or an aromatic polyimide at a temperature of 2000° C. or above. Further, a highly electroconductive composition is obtained by treating the carbonaceous material mentioned above with a dopant.

12 Claims, No Drawings

HIGHLY ELECTROCONDUCTIVE PYROLYZED PRODUCT RETAINING ITS ORIGINAL SHAPE AND COMPOSITION FORMED THEREFROM

This invention relates to a carbonaceous material having a high electroconductivity and a composition formed therefrom. More perticularly, it relates to a highly electroconductive carbonaceous material and a composition formed therefrom which are produced by a method comprising pyrolysis of a conjugated polymer or an aromatic polyimide.

In recent years, it was found that a complex of natural or artificial graphite of high purity with an electron acceptor or electron donor (hereinafter referred to as dopant) exhibits a high electroconductivity exceeding those of metals, and hence such a complex has come to attract attention as a highly electroconductive material. As a highly electroconductive carbonaceous material of this kind, there is already known pyrolytic graphite which is obtained by subjecting a hydrocarbon compound to vaporphase pyrolysis at high temperatures to give a pyrolytic carbon and then heat-treating the latter at superhigh temperatures. This carbonaceous material has a highly developed graphite structure and exhibits a still more high electroconductivity by complex formation with a dopant.

Meanwhile, it has also been attempted to obtain a carbonized, or further, graphitized carbonaceous material by pyrolyzing a polymer. For example, there is known a method to pyrolyze organic fibers such as those of polyacrylonitrile or rayon to give carbon fibers.

In the above method, however, the electroconductivity of the carbon fiber obtained is low, being not higher than $10^3$ S/cm even after heat-treatment at 3000° C.; also, the improving effect upon electroconductivity by complex formation with dopant is exhibited only slightly; thus a sufficiently graphitized material cannot be obtained. Thus, a carbonaceous material obtained by pyrolyzing a polymer does not always take on the graphite structure. Rare examples of polymar materials which are known to be graphitized more easily include a special phenol resin [Y. Yamasita, K. Ouchi and M. Shiraishi, Tanso, 82, 102(1975)]. But this material melts or softens during the course of pyrolyzing and carbonization, and hence does not retain its original shape.

In order to obtain a carbonaceous material having an industrially useful form such as films or fibers in general, it is essential to apply an insolubilizing treatment such as oxidative crosslinking by air in pyrolyzing. But this treatment is not suited for obtaining a highly electroconductive material. Accordingly, it has been extremely difficult to obtain a carbonaceous material which can be pyrolyzed while retaining its original shape and, at the same time, has a high electroconductivity.

As polymer which can be made into an electroconductive material by pyrolysis while retaining its original shape, there are already disclosed thermoresistant polymer as aromatic polyimide [H. B. Brom, Solid State Communication, 35, 135(1980)], aromatic polyamide [Japanese Patent Application Kokai (Laid-open) No. 163909/82]and aromatic polyamide-imide [Japanese Patent Application Kokai (Laid-open) No. 34604/82]. But these polymers are pyrolyzed at 1500° C. or below and all exhibit an electroconductivity of about $10^2$ S/cm or less, and hence cannot be called highly electroconductive materials.

The present inventors made an extensive study in search of a polymer which can be pyrolyzed while retaining its original shape and made to have a high electroconductivity. As a result, this invention has been achieved based on the following novel finding. It has been found that when films or fibers of a conjugated polymer built up of a recurring unit formed from a vinylene group and an aromatic hydrocarbon group conjugated therewith are pyrolyzed in an inert atmosphere at a temperature above 400° C., they can not only be carbonized while retaining their shape without melting but be graphitized at high temperatures to give highly electroconductive materials and moreover exhibit a still more high electroconductivity by doping treatment, and that when an aromatic polyimide is pyrolyzed in an inert atmosphere at 2000° C. or above, it can be easily graphitized to give, surprisingly, a material having a high electroconductivity exceeding $10^4$ S/cm and, further, exhibits a still more high electroconductivity exceeding $10^5$ S/cm by doping treatment. Thus, it has been found that, whereas aromatic polyamide or aromatic polyamideimide shows very little improvement in electroconductivity when treated under pyrolysis conditions similar to those for aromatic polyimide, the last-mentioned material exhibits a specifically marked improvement in electroconductivity when treated at a temperature exceeding 2000° C.

It has been utterly unexpectable that a conjugated polymer represented by the general formula  mentioned later, such as poly-p-phenylenevinylene, or an aromatic polyimide, which has been formed into a desired shape, can be made, by pyrolysis treatment, into a carbonaceous formed article without melting or softening and while retaining its original shape and, further, made into a carbonaceous material having a high electroconductivity.

An object of this invention is to provide a novel carbonaceous material having a high electroconductivity and a composition formed therefrom as well as a method for preparing the same.

Other objects and advantages of this invention will become apparent from the following descriptions.

According to this invention, there are provided (i) a method for preparing a highly electroconductive carbonaceous material which comprises pyrolyzing in an inert atmosphere a conjugated polymer represented by the general formula $$\pm R—CH=CH\frac{}{n}$$

wherein R is an aromatic hydrocarbon group which forms a consecutive carbon to carbon conjugated system with the vinylene group, and n is an integer of at least 2, at a temperature above 400° C., or an aromatic polyimide at a temperature of 2000° C. or above, (ii) a method for preparing a highly electroconductive composition which comprises pyrolyzing in an inert atmosphere a conjugated polymer represented by the general formula

wherein R is an aromatic hydrocarbon group which forms a consecutive carbon to carbon conjugated system with the vinylene group, and n is an integer of at least 2, at a temperature above 400° C., or an aromatic polyimide at a temperature of 2000° C. or above, and treating the resulting carbonaceous material with a dopant, and (iii) a carbonaceous material having high electroconductivity and a composition formed therefrom by the above methods (i) and (ii).

With respect to the method of synthesis of the conjugated polymer used in this invention, there is no specific restriction, and various methods can be used. Preferred examples of the methods include the Wittig reaction method described in J. Amer. Chem. Soc., 82, 4669(1960), the dehydrochlorination method described in Makromol. Chem., 131, 105(1970) and the sulfonium salt decomposition method described in J. Polymer Sci., A-1, 6, 1058(1968). Particularly, the conjugated polymer obtained by the sulfonium salt decomposition method is favorably used since it can be formed into uniform film-like or fiber-like articles.

The group R in the conjugated polymer used in this invention is an aromatic hydrocarbon group having a structure capable of being conjugated with the vinylene group or a derivative group thereof, and preferably an aromatic hydrocarbon group having 6 to 20 carbon atoms or a derivative thereof.

Examples of such groups include the o-phenylene, p-phenylene, 4,4'-biphenylene, 2,5-dimethyl-p-phenylene, 2,5-dimethoxy-p-phenylene, 3,4-dimethyl-o-phenylene and 3,4-dimethoxy-o-phenylene group. More preferred of these groups are the p-phenylene, 2,5-dimethyl-p-phenylene, 4,4'-biphenylene, and 2,5-dimethoxy-p-phenylene group, which have structures of good symmetry, because they show good retaining of shape during pyrolysis. Particularly preferred is the p-phenylene group.

The conjugated polymer used in this invention is preferably of a sufficiently high molecular weight. Those having preferably a molecular weight corresponding to n of at least 2, preferably 5 to 50,000, are effectively used.

The aromatic polyimide used in this invention may be obtained as the condensation product of pyromellitic acid with an aromatic diamine. Although not restricted specifically, it is preferably an aromatic polyimide represented by the general formula

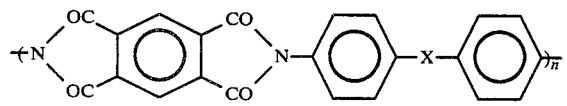

wherein X denotes —O—, —CH$_2$—or

and n is an integer of at least 2, preferably 5 to 500. Particularly preferred is poly-N,N'—P,P'-oxydiphenylene)pyromellitimide which is represented by the above-mentioned general formula wherein X denotes O (oxygen).

The conjugated polymer to be pyrolyzed in this invention may be in the form of any formed articles including sheet, film, fiber, etc. Formed articles of a polymer, which are in the form of film or fiber and have been oriented by stretching, are particularly preferred since they give higher electroconductivity.

The stretching may be applied on the formed article of the polymer, but it may also be applied on precursor polymer or conducted during the course of conversion from precursor polymer to conjugated polymer or aromatic polyimide.

The pyrolyzing temperature in this invention varies depending on the polymers to be used. For conjugated polymer built up of a recurring unit formed from a vinylene group and an aromatic hydrocarbon group conjugated therewith, it is preferably a temperature above 400° C. The upper limit of the temperature is restricted by the evaporation temperature of carbon. Though the pyrolysis can be conducted at still higher temperatures under pressure application, it is economically unfavorable. For obtaining highly electroconductive material, the higher the pyrolyzing temperature is, the better the result is. In practice, the pyrolysis is conducted preferably at temperatures above 400° C. and not higher than 3500° C., and more preferably at temperatures not lower than 800° C. and not higher than 3300° C.

The pyrolyzing temperature of aromatic polyimide in this invention is preferably not lower than 2000° C., the upper limit of the temperature being restricted by the evaporation temperature of carbon. Though the pyrolysis can be conducted at still higher temperatures under pressure application, it is economically unfavorable. For obtaining highly electroconductive material, the higher the pyrolyzing temperature is, the better the result is. In practice, the pyrolysis is conducted preferably at temperatures above 2000° C. and not higher than 3500° C., and more preferably at 2500° C. or above.

The pyrolysis may also be conducted by pyrolyzing provisionally at 1000° C. or below and subsequently pyrolyzing at 2000° C. or above.

Examples of effective inert atmosphere used in this invention include nitrogen gas, argon gas, and vacuum. For pyrolyzing at 2000° C. or above, argon is more preferable.

The heating method in pyrolysis is not restricted specifically; but it is varied according to the pyrolyzing temperature required. Namely, for temperatures of 1500° C. and below, a resistance-wire furnace or a Siliconit furnace with a silicon carbide heating element, and for temperatures of 1500° C. and above, a Tammann furnace with graphite heating-element or a high-frequency induction heating furnace are effectively used, respectively.

The pyrolyzed product of the conjugated polymer thus obtained exhibits usually an electroconductivity of $10^2$ to $10^4$ S/cm, and that of aromatic polyimide exhibits an electroconductivity of $10^3$ to $10^4$ S/cm.

What is more important is that, when the pyrolyzed product mentioned above is doped with an electron acceptor or an electron donor, the electroconductivity is improved further, reaching $10^3$ to $10^5$ S/cm or higher in the former, and $10^4$ to $10^5$ S/cm or higher in the latter. The type of dopants is not restricted specifically; those compounds which have been previously found to give a high electroconductivity in conjugated polymer such as polyacetylene or graphite can be effectively used.

The doping may be conducted in a known manner including a method to place the pyrolyzed product directly in contact with dopant in vapor or liquid phase, an electrochemical method, and ion implantation.

Specific examples of electron acceptors include halogens such as iodine, and bromine; Lewis acids such as iron trichloride, arsine pentafluoride, antimony pentafluoride, boron trifluoride, sulfur trioxide, aluminum trichloride and antimony pentachloride; and protonic acids such as nitric acid, sulfuric acid and chlorosulfonic acid; those of electron donors include alkali metals such as lithium, potassium, rubidium and cesium; alkaline earth metals such as calcium, strontium and barium; and further, rare earth metals such as Sm, Eu and Yb; and metal amides such as potassium amide, and calcium amide. The amount of dopants is not restricted specifically, but preferably their amount is 0.1 to 150%, particularly 10 to 100%, based on the weight of the pyrolyzed product.

The pyrolyzed polymer product of this invention is featured in that, as contrasted to the prior graphite materials, it can be made into a pyrolyzed product formed in any desired shape such as films or fibers and having a high electroconductivity; accordingly, it can be used in a variety of fields where high electroconductivity is required.

This invention will be illustrated in more detail below with reference to Examples, but it is not limited thereto.

EXAMPLE 1

By the reaction of p-xylylenebis(diethylsulfonium bromide) with an aqueous solution of sodium hydroxide, there was obtained an aqueous solution of a polyelectrolyte having sulfonium salts in side chains. The solution was subsequently dialyzed against deionized water by using a membrane of cellulose (molecular weight cut-off level, 3500), and the dialyzed solution was casted and dried at 30° C. or below under reduced pressure.

The film, 5 cm in length and 10 cm in width, was subjected to a stationary heat treatment in a horizontal tube furnace under nitrogen atmosphere at 200° C. for 2 hours. The product had poly-p-phenylenevinylene structure and an electroconductivity of $10^{-10}$ S/cm or below.

Then, a center tube (30 mm in diameter and 700 mm in length) made of guartz glass was inserted in a horizontal tube electric furnace (450 mm in length) of resistant-wire heating type and the whole apparatus was assembled so that an inert gas may be introduced into the center tube. The film obtained above (50 mm in length and 20 mm in width) was placed in the center tube positioned in the center of the electric furnace, and the temperature in the electric furnace was raised to 950° C. while nitrogen gas being passed at a rate of 100 ml per minute through the tube. After 2 hours of pyrolyzing at 950° C., the furnace was cooled down to room temperature and the pyrolyzed product was taken out. The obtained product retained the film form.

The film thus obtained showed an electroconductivity of 90 S/cm at room temperature. The film was further subjected to vapor-phase doping at room temperature in a conventional manner with sulfur trioxide used as dopant to show an electroconductivity of 136 S/cm after 24 hours.

EXAMPLE 2

The pyrolyzed film obtained as in Example 1 was further pyrolyzing at 3000° C. The pyrolysis was conducted in an argon gas stream for 20 minutes by the use of a graphite tube heating-element. The pyrolyzed product retained the film form. The film showed an electroconductivity of $2.1 \times 10^3$ S/cm at room temperature. Further, after doped with sulfur trioxide, it showed an electroconductivity of $1.1 \times 10^4$ S/cm.

EXAMPLE 3

The cast film of the polyelectrolyte having sulfonium salt obtained in Example 1 was heated at temperatures rising up to 150° C. while being uniaxially stretched at a stretching rate of 10 mm per minute, and then annealed at constant length at 200° C. for 30 minutes to give a film stretched 10.8-folds. The resulting film was pyrolyzed in a nitrogen gas stream at 950° C. The stretched film retained the film form. The film thus obtained showed an electroconductivity of 120 S/cm and, after doped with sulfur trioxide, of 150 S/cm.

EXAMPLE 4

The original polyelectrolyte solution obtained as in Example 1 was extruded out into a 50% aqueous sodium hydroxide solution to form a filament. The filament thus formed was stretched at 150° C. to give a filament stretched 6-folds. The stretched filament was heated in an argon gas stream up to 3000° C. in 2 hours, and subsequently pyrolyzed at 3000° C. for 20 minutes. The pyrolyzed product retained the filament form.

The pyrolyzed filament showed an electroconductivity of $1.2 \times 10^4$ S/cm and, after doped with sulfur trioxide, of $1.1 \times 10^5$ S/cm.

EXAMPLE 5

Polymerization and film-casting of polyelectrolyte having sulfonium salt were conducted in the same manner as in Example 1 except that 2,5-dimethyl-p-xylylenebis(diethylsulfonium bromide) was used.

The obtained film, 5 cm in length and 1 cm in width, was heat-treated in argon atmosphere at 200° C. for 2 hours to be converted to poly-2,5-dimethyl-p-phenylene-vinylene structure, then heated, as it was, up to 3000° C. in 2 hours, and pyrolyzed at 3000° C. for 20 minutes. The pyrolyzed product retained the film form.

The resulting film showed at room temperature an electroconductivity of $5.2 \times 10^3$ S/cm and, after doped with nitric acid, of $8.6 \times 10^3$ S/cm.

EXAMPLE 6

Polymerization and film-casting of polyelectrolyte having sulfonium salt were conducted in the same manner as in Example 1 except that 2,5-dimethoxy-p-xylylenebis(diethylsulfonium bromide) was used.

The polyelectrolyte having sulfonium salt film obtained was heat-treated under a nitrogen stream at temperatures rising up to 200° C. to give poly-2,5-dimethoxy-p-phenylene-vinylene structure, and then pyrolyzed in an argon gas atmosphere at 3000° C. The pyrolyzed product retained the film form.

The resulting film showed at room temperature an electroconductivity of $5.5 \times 10^3$ S/cm and, after doped with nitric acid, of $7.2 \times 10^3$ S/cm.

EXAMPLE 7

A 25μ-thick film of aromatic polyimide obtained by condensation of pyromellitic acid with diaminodiphenyl ether was subjected to provisional pyrolyzing under a nitrogen gas stream at 950° C. in a horizontal tube electric furnace.

The provisionally pyrolyzed product obtained had an electroconductivity of 41 S/cm and showed almost no improvement in electroconductivity after doped with sulfur trioxide.

The provisionally pyrolyzed product was heated in a Tammann furnace provided with graphite heat-element under a stream of argon gas from room temperature up to 3000° C. in 2 hours, and subsequently pyrolyzed at 3000° C. for 20 minutes. The pyrolyzed product retained the film form; it showed at room temperature an electroconductivity of $1.6 \times 10^4$ S/cm and, after doped with sulfur trioxide, of $1.9 \times 10^5$ S/cm.

EXAMPLE 8

A 15μ-thick, uniaxially stretched film of an aromatic polyimide prepared by condensation of pyromellitic acid with diaminodiphenylmethylene was heated in a Tammann furnace provide with graphite heat-element under a stream of argon gas from room temperature up to 2500° C. in 1.5 hours, and subsequently pyrolyzed at 2500° C. for 20 minutes. The pyrolyzed product retained the film form; it showed at room temperature an electroconductivity of $1.1 \times 10^3$ S/cm and, after doped with sulfur trioxide, of $3.9 \times 10^3$ S/cm.

COMPARATIVE EXAMPLE

A 50μ-thick film of an aromatic polyamide-imide obtained by condensation of trimellitic acid with diaminodiphenyl ether and an aromatic polyamide fiber having p-phenylene terephthalamide structure were pyrolyzed under the same conditions as in Example 1. After provisional pyrolyzing under a stream of nitrogen at 950° C., they showed an electroconductivity of 52 S/cm and 30 S/cm, respectively, and showed almost no improvement in electroconductivity when subsequently doped with sulfur trioxide. When these provisionallly pyrolyzed products were heat-treated under a stream of argon gas at 3000° C., they showed only an electroconductivity of 200 S/cm or 980 S/cm, respectively.

As is apparent from the foregoing, the conjugated polymer and aromatic polyimide are markedly improved in its electroconductivity by heat treatment, and can be made into a highly electroconductive material.

What is claimed is:

1. A method for preparing a highly electroconductive carbonaceous material which comprises pyrolyzing in an inert atmosphere a conjugated polymer represented by the general formula $$-(R-CH=CH)_n-$$

wherein R is an aromatic hydrocarbon group having 6 to 20 carbon atoms which forms a consective carbon to carbon conjugated system with the vinylene group, and n is an integer of 5 to 50,000, at a temperature of 400° to 3500° C.

2. A method according to claim 1, wherein the group R in the general formula is p-phenylene group, 2,5-dimethyl-p-phenylene group, 4,4'-biphenylene group, or 2,5-dimethoxy-p-phenylene group.

3. A method for preparing a highly electroconductive carbonaceous material according to claim 1, wherein the conjugated polymer is in the form of a stretch-oriented formed article.

4. A carbonaceous material having a high electroconductivity formed by the method of claim 1.

5. A method for preparing a highly electroconductive composition which comprises pyrolyzing in an inert atmosphere a conjugated polymer represented by the general formula $$-(R-CH=CH)_{\overline{n}}$$

wherein R is an aromatic hydrocarbon group having 6 to 20 carbon atoms which forms a consecutive carbon to carbon conjugated system with the vinylene group, and n is an integer of 5 to 50,000 at a temperature of 400° to 3500° C., or an aromatic polyimide represented by the general formula

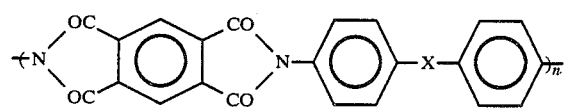

wherein X denotes —O—, —CH$_2$—or

and n denotes an integer of 5 to 500, at a temperature of 2000° to 3500° C., and treating the resulting carbonaceous material with a dopant, wherein the amount of dopant is 0.1 to 150% based on the weight of the pyrolyzed product.

6. A method according to claim 5, wherein the dopant is an electron acceptor or electron donor.

7. A method according to claim 6, wherein the electron acceptor is halogens, Lewis acids, or protonic acids.

8. A method according to claim 6, wherein the electron donor is alkali metal, alkalline earth metals or rare earth metals.

9. A method according to claim 5, wherein the group R in the general formula is p-phenylene group, 2,5-dimethyl-p-phenylene group, 4,4'-biphenylene group, or 2,5-dimethoxy-p-phenylene group.

10. A method according to claim 5, wherein the aromatic polyimide is poly-N,N'—p,p'-oxydiphenylene)-pyromellitimide.

11. A method according to claim 5, wherein the conjugated polymer or the aromatic polyimide is in the form of a stretch-oriented formed article.

12. A high electroconductive composition formed by the method of claim 5.